United States Patent [19]

Abe et al.

[11] 4,008,358

[45] Feb. 15, 1977

[54] PROCESS FOR POLYMERIZING OLEFIN

[75] Inventors: Toshizo Abe; Seiho Sakamoto; Yasuhiro Nishihara; Hidetoshi Saruwatari, all of Kurashiki, Japan

[73] Assignee: Mitsubishi Chemical Industries Ltd., Tokyo, Japan

[22] Filed: June 26, 1975

[21] Appl. No.: 590,506

[30] Foreign Application Priority Data

July 27, 1974 Japan .............................. 49-73675

[52] U.S. Cl. ............................. 526/116; 252/429 C
[51] Int. Cl.$^2$ ....................... C08F 4/68; C08F 4/64
[58] Field of Search ................ 260/94.9 E, 88.2 R, 260/85.3 R, 93.7; 252/429 C; 526/116

[56] References Cited

UNITED STATES PATENTS

| | | | |
|---|---|---|---|
| 3,696,086 | 10/1972 | Wagensommer ............. | 260/88.2 R |
| 3,723,350 | 3/1973 | Schmitt et al. ................ | 260/94.9 E |
| 3,725,364 | 4/1973 | Wagensommer et al. ..... | 260/88.2 R |
| 3,766,158 | 10/1973 | Yamaguchi et al. .......... | 260/85.3 R |
| 3,859,267 | 1/1975 | Yamaguchi et al. .......... | 260/85.3 R |
| 3,888,834 | 6/1975 | Yamaguchi et al. .......... | 260/85.3 R |
| 3,899,477 | 8/1975 | Altemore et al. ............. | 260/94.9 E |
| 3,926,929 | 12/1975 | Enokido et al. ............... | 260/85.3 R |

*Primary Examiner*—Alan Holler
*Attorney, Agent, or Firm*—Oblon, Fisher, Spivak, McClelland & Maier

[57] ABSTRACT

A process for polymerizing an olefin comprises effecting said polymerization in contact with a catalyst of a combination of a first solid component prepared by treating a mixture of (a) a titanium tetrahalide, (b) a vanadyl alcoholate and (c) a vanadyl trihalide, with an organoaluminum compound, and a second component of an organoaluminum compound.

13 Claims, No Drawings

PROCESS FOR POLYMERIZING OLEFIN

BACKGROUND OF THE INVENTION

1. Field of the Invention

The present invention relates to a process for preparing a polyolefin. More particularly, it relates to an improved process for polymerizing an olefin to obtain a polymer having a wide molecular weight distribution by using a novel catalyst having a remarkably high catalytic activity.

2. Description of the Prior Art

Heretofore, it has been well-known that catalysts made up of combinations of the transition metal compounds of Groups IVa – VIa of the Periodic Table and organo-metallic compounds of Groups Ia – IIIa of the Periodic Table, are remarkably effective for polymerizing an olefin at relatively low temperatures under relatively low pressure. However, these catalysts are not satisfactory from an industrial point of view for a number of reasons.

If the activity of the catalyst used for preparing the polyolefin is sufficiently high, the necessity of removal of the catalyst following polymerization can be avoided. The industrial advantages of the elimination of this step are very significant.

The molecular weight distribution of the resulting polymer affects both the formability of the polymer and the appearance of the molded product. That is, polymers having a narrow molecular weight distribution are suitable for injection molding. On the other hand, polymers having a wide molecular weight distribution are suitable for extrusion molding. Accordingly, it is quite advantagous industrially, to be able to preselect the molecular weight distribution and to achieve that selected distribution by control techniques. From both these viewpoints, the Ziegler catalysts and the other above-mentioned catalyst systems are not always satisfactory.

Previously, the present inventors had disclosed a process for polymerizing an olefin using a catalyst of high catalytic activity. In that previous disclosure the catalyst was indicated as being a combination of an organoaluminum compound and eutectic crystals which are prepared by reducing a mixture of titanium tetrahalide and vanadyl oxyalcoholate with an organoaluminum compound and separating the eutectic crystals from the unreacted materials and the solvent. (Japanese Patent Publication No. 11269/1974). The polymers prepared by using this catalyst system, however, have a narrow molecular weight distribution and are not suitable for extrusion molding.

A need continues to exist for an industrially acceptable process for polymerizing an olefin whereby the achievable molecular weight distributions using a catalyst with very high activity, can be enlarged.

SUMMARY OF THE INVENTION

Accordingly, it is an object of the present invention to provide a process for polymerizing an olefin yielding a polymer having a wide molecular weight distribution which is suitable for extrusion molding wherein a catalyst having very high activity is employed.

Briefly, this and other objects of this invention as will hereinafter be made clear by the ensuing discussion have been attained by providing a process for polymerizing an olefin in the presence of a catalyst which comprises the combination of an organoaluminum compound and a solid catalytic component which is prepared by mixing
 (a) a titanium tetrahalide
 (b) a vanadyl alcoholate and
 (c) a vanadyl trihalide,
and then, treating the mixture with an organoaluminum compound.

DETAILED DESCRIPTION OF PREFERRED EMBODIMENTS

In the process of this invention, the titanium tetrahalides (hereinafter referred to as component (a)) used for the preparation of the solid catalytic component, are compounds having the formula:

$$TiX_4$$

wherein X represents a halogen atom, preferably I, Cl, Br and F. Suitable titanium tetrahalides include titanium tetrachloride, titanium tetrabromide, titanium tetraiodide and the like. The vanadyl alcoholates (hereinafter referred to as component (b)) are compounds having the formula:

$$VO(OR)_3$$

wherein R represents a $C_{1-14}$ hydrocarbon residue. R is preferably an alkyl group such as methyl, ethyl, propyl, butyl, pentyl and the like. Suitable vanadyl alcoholates include triethoxy vanadyl, tri-iso-propoxy vanadyl, tri-iso-butoxy vanadyl, tri-n-butoxy vanadyl and the like. The vanadyl trihalide (hereinafter referred to as component (c)) are compounds having the formula:

$$VOX_3$$

wherein X represents a halogen atom. Suitable vanadyl trihalides include vanadyl trichloride, tribromide, triiodide and the like. The organo-aluminum compounds used for treating the mixture of the titanium compound and the vanadium compound, are compounds having the formula:

$$AlR_nX_{3-n}$$

wherein R represents a $C_{1-14}$ hydrocarbon residue; X represents a halogen atom, particularly I, Br, Cl, and F and n represents the integers, 1–3. Suitable hydrocarbons R include alkyl; aralkyl, such as lower alkyl phenyl; aryl, such as phenyl; and alicyclic groups, particularly 5 and 8 membered rings and the like; preferably, alkyl. Suitable organoaluminum compounds include trialkylaluminums such as triethylaluminum, tri-isobutyl-aluminum; dialkylaluminum monohalides such as dimethylaluminum monochloride, diethylaluminum monochloride; alkylaluminum sesquihalides such as methylaluminum sesquichloride, ethylaluminum sesquichloride; and alkylaluminum dihalides such as methylaluminum dichloride, ethylaluminum dichloride. Among the organoaluminum compounds, the alkylaluminum sesquihalides and alkylaluminum dihalides are preferred.

In the operation of mixing the titanium compound and the vanadium compound the above-mentioned components (a), (b) and (c) are mixed with or without a hydrocarbon diluent, in any desirable order. Suitable hydrocarbon diluents include aliphatic hydrocarbons, e.g., pentane, hexane, heptane, octane, iso-octane and the like; cyclic hydrocarbons, e.g., cyclopentane, cyclohexane and the like; and aromatic hydrocarbons, e.g., benzene, toluene and the like. It is possible to use other diluents which are customarily used for polymerizing an olefin. The operation of mixing the components (a), (b) and (c) is usually conducted at from room temperature to 150° C in an inert gas atmosphere.

The amounts of the vanadium compounds [components (b) and (c)] relative to the amount of the titanium compound [component (a)] should be selected to give a molar ratio of component (a)/ components (b) + (c). within the range 0.05–10, preferably 0.2–5. so as to impart the desired catalytic activity. The molar ratio of component (c) to component (b) is not critical, and is preferably lower than 5 because the catalytic activity decreases when the molar ratio of component (c)/component (b) is too high. After mixing the components (a), (b) and (c), the mixture of the reaction mixture can be aged by heating (for example at 60°–300° C).

The mixture of the titanium compound and the vanadium compound or the reaction mixture is preferably treated with the organoaluminum compound at 0°–150° C in the presence of the hydrocarbon diluent in an inert gas atmosphere. It is advantageous to conduct the treatment at about room temperature. It is possible to age by heating at 60°–150° C after the treatment. The amount of the organoaluminum employed is preferably more than the equimolar amount relative to the total amounts of the titanium and vanadium compounds. After the treatment, the resulting solid component is separated from the unreacted starting material and the hydrocarbon diluent in the inert gas atmosphere by means of filtration, centrifugal separation or the like. After the separation, the solid component is washed with a hydrocarbon diluent in order to substantially remove the unreacted starting material, and the hydrocarbon diluent on the solid cmponent. When the solid component is formed as a block, it is preferred to crush it in some desirable manner. The crushing operation can be performed in an inert gas atmosphere by a conventional method such as stirring, by use of a ball mill and the like.

Suitable organoaluminum compounds which are to be used as the second component in combination with the first solid component above include compounds having the formula:

wherein R represents a hydrocarbon group having 1 – 14 carbon atoms such as the alkyl, aralkyl, particularly the lower alkyl phenyl, aryl, alicyclic, particularly the 5 and 8 membered rings, groups and the like; X represents a halogen atom particularly F, Cl, Br and I or an alkoxy group, and n represents an integer of 1–3. When X is an alkoxy group, $n$ is 2. Suitable organoaluminum compounds include the organoaluminum compounds previously mentioned and also organoaluminum compounds having an alkoxy group such as dimethylaluminum monomethoxide, diethylaluminum monoethoxide, and the like. Trialkylaluminum compounds and dialkylaluminum monoalkoxide compounds are preferred and trialkylaluminum compounds such as $Al(C_2H_5)_3$, $Al(n-C_4H_9)_3$, $Al(iso-C_4H_9)_3$ and $Al(n-C_8H_{17})_3$ are especially preferred. The catalyst is prepared by combining the first solid component described above with the second component of the organoaluminum compound. The amounts of the first solid component and the organoaluminum compound are chosen so that the $Al$ to transition metal atomic ratio is 0.1 – 500, preferably 1 – 50.

The polymerization of the olefin is to be conducted using the catalyst. Suitable olefins for use in the process of the invention include ethylene, propylene, butene-1, or the like. The olefins can be either homopolymerized or copolymerized. It is especially preferred to use ethylene alone or a mixture of ethylene and a small amount of another α-olefin or diolefin, e.g., propylene, butene-1, 1,3-butadiene or the like. The polymerization is preferably conducted by dispersing the catalyst in the above-mentioned hydrocarbon diluent and feeding the olefin or a mixture thereof, at a temperature of from room temperature to 200° C under a pressure of from atmospheric pressure to 100 atm. In order to obtain the desired characteristics, it is preferred to use slurry polymerization at 60°–100° C with the desired hydrocarbon diluent so as to obtain a powdery polymer having high bulk density. The average molecular weight of the resulting polyolefin can be controlled by the pressure of an appropriate amount of hydrogen in the polymerization reaction zone. The amount of hydrogen is controlled dependent upon polymerization conditions and the desired average molecular weight of the polyolefin. The catalysts of the invention are rapidly deactivated by the affect of water or oxygen. Accordingly, it is necessary to use pure olefins, hydrogen and diluents for feeding into the polymerization system.

As stated above, when a catalyst prepared in accordance with the invention is used, remarkably high catalytic activity (catalyst coefficient) is derived and polyolefins having a remarkably wide molecular weight distribution can be obtained. As shown in the following examples, the molecular weight distribution of the polyolefin can be easily controlled by selecting the ratio of the titanium compound to the vanadium compounds. That is, when a ratio of the amount of component (a) or component (c) to the total amount of components (a), (b) and (c), is high, the molecular weight distribution can be wide. When slurry polymerization of the olefin is conducted in accordance with this invention, polyolefins having very high bulk densities can be obtained. A further understanding can be obtained by reference to certain specific examples which are provided herein for purposes of illustration only and are not intended to be limiting in any manner unless otherwise specified. In the examples, the melt index (M I) was measured by ASTM D-1238; and the flow ratio (F R) is the ratio of the amount of polymer flowed at a shear stress of $10^6$ dyne/cm$^2$ to that at a shear stress of $10^5$ dyne/cm$^2$ which was measured by using the melt indexer described in ASTM D-1238; e.g. FR= (flow rate at $10^6$ dyne/cm$^2$) / (flow rate at $10^5$ dyne/cm$^2$). When the flow ratio (F R) is high, the molecular weight distribution is wide. When the flow ratio (F R) is low, the molecular weight distribution is narrow.

EXAMPLE 1

In a 500 ml flask purged with argon, 100 ml of dry and oxygen-free (dehydrated and deoxided) benzene, 50 mmole of titanium tetrachloride, 17 mmole of vanadyl trichloride and 33 mmole of n-butoxy vanadyl were charged. The mixture was heated to 60° C with stirring and was stored for 1 hour. The temperature was then controlled to 20° C and 150 mmole of ethylaluminum sesquichloride was added dropwise to the mixture. After the addition, the mixture was stirred at 20° C for 2 hours. The unreacted materials and the solvent were separated by decantation and the crystals were washed with pure benzene while repeating the stirring. The decantations were repeated five times to obtain a benzene insoluble solid product. In a 2 liter autoclave purged with dry nitrogen gas, 1 liter of pure n-hexane, 10 mg of the resulting solid product and 0.15 mmole of triethylaluminum were charged. The mixture was heated to 80° C and hydrogen was fed at 8 Kg/cm² (gauge). A constant pressure polymerization was conducted at 80° C by feeding only ethylene to maintain the total pressure for 90 minutes, to obtain 226 g of polyethylene. The characteristics of the resulting polyethylene are shown in Table 1.

EXAMPLE 2

The preparation of the catalyst and the polymerization of ethylene were repeated in accordance with the process of Example 1 except for varying the hydrogen pressure as shown in Table 1. The results are shown in Table 1.

REFERENCE EXAMPLE 1

The preparation of the catalyst and the polymerization of ethylene were repeated in accordance with the process of Example 1 except for using no tri-n-butoxy vanadyl and varying the total pressure and the hydrogen pressure as shown in Table 1. The results are shown in Table 1.

REFERENCE EXAMPLE 2

The preparation of the catalyst and the polymerization of ethylene were repeated in accordance with the process of Example 1 except for using no vanadyl trichloride. The results are shown in Table 1.

Table 1

|  | Total pressure kg/cm² (gauge) | PETY Kg/cm² | PH$_2$/PETY mole % | Yield of polymer g | MI g/10 min. | FR |
| --- | --- | --- | --- | --- | --- | --- |
| Exp. 1 | 15 | 6.7 | 120 | 226 | 1.8 | 31 |
| Exp. 2 | 15 | 8.7 | 75 | 380 | 0.23 | 29 |
| Ref. 1 | 30 | 14.0 | 120 | 90 | 2.3 | 28 |
| Ref. 2 | 15 | 7.3 | 110 | 246 | 2.4 | 24 |

Note:
PETY: ethylene partial pressure
PH$_2$/PETY: molar ratio of hydrogen to ethylene in gas phase
MI: melt index
FR: flow ratio

EXAMPLES 3 – 6

The preparation of the catalyst and the polymerization of ethylene were repeated in accordance with the process of Example 1 except for varying the amounts of titanium tetrachloride, tri-n-butoxy vanadyl and vanadyl trichloride and varying the temperature used for treating with the organoaluminum compound and the amount of hydrogen as shown in Table 2. The results are shown in Table 2.

Table 2

|  | Exp. 3 | Exp. 4 | Exp. 5 | Exp. 6 |
| --- | --- | --- | --- | --- |
| TiCl$_4$ (mmole) | 60 | 60 | 75 | 50 |
| VO(O-n-C$_4$H$_9$) (m mole) | 20 | 20 | 12.5 | 17 |
| VOCl$_3$ (mmole) | 20 | 20 | 12.5 | 33 |
| temperature for treatment (° C) | 20 | 60 | 10 | 60 |
| PH$_2$/PETY (mole %) | 150 | 120 | 80 | 100 |
| Yield of polymer (g) | 380 | 360 | 490 | 200 |
| MI (g/10 min.) | 2.7 | 0.54 | 0.42 | 0.37 |
| FR | 32 | 31 | 36 | 33 |

EXAMPLE 7

The preparation of the catalyst and the polymerization of ethylene were repeated in accordance with the process of Example 1 except for using tri-iso-butylaluminum instead of triethylaluminum. As a result, 300 g of polyethylene having a melt index of 1.1 and a flow ratio of 30 was obtained.

EXAMPLE 8

The preparation of the catalyst and the polymerization of ethylene were repeated in accordance with the process of Example 1 except for feeding propylene under a propylene partial pressure of 0.27 kg/cm² together with hydrogen and ethylene. As a result, 305 g of polyethylene having a melt index of 3.2 and a flow ratio of 27 was obtained. According to an infrared spectrographic analysis of the resulting polyethylene, it was found that the polymer had pendant methyl groups in a ratio of 2.3/1000C.

EXAMPLE 9

The preparation of the catalyst and the polymerization of ethylene were repeated in accordance with the process of Example 3 except for varying the ratio of hydrogen pressure to ethylene pressure (PH$_2$/PETY) to 106 mole % and polymerizing at 90° C. The results are shown in Table 3.

EXAMPLE 10

The preparation of the catalyst and the polymerization of ethylene were repeated in accordance with Example 9 except for changing the amount of triethyl aluminum to 0.05 mmole and the hydrogen pressure to ethylene pressure ratio (PH$_2$/PETY) to 100mole %. The results are shown in Table 3.

EXAMPLE 11

The preparation of the catalyst and the polymerization of ethylene were repeated in accordance with the process of Example 5 except for using diethylaluminum monoethoxide instead of triethylaluminum and varying the temperature for treatment and the hydrogen pressure to ethylene pressure ratio (PH$_2$/PETY) as shown in Table 3. The results are shown in Table 3.

EXAMPLE 12

The preparation of the catalyst and the polymerization of ethylene were repeated in accordance with the process of Example 5 except for changing the amount of ethylaluminum sesquichloride to 100 mmole and the hydrogen pressure to ethylene pressure ratio ($PH_2$/PETY) to 83 mole%. The results are shown in Table 3.

EXAMPLE 13

The preparation of the catalyst and the polymerization of ethylene were repeated in accordance with Example 3 except for using 200 mmole of ethylaluminum dichloride instead of ethylaluminum sequichloride and varying the temperature for treatment and the hydrogen pressure to ethylene pressure ratio ($PH_2$/PETY) as stated in Table 3. The results are shown in Table 3.

Table 3

| Example | | 9 | 10 | 11 | 12 | 13 |
|---|---|---|---|---|---|---|
| $TiCl_4$ (mmole) | | 60 | 60 | 75 | 75 | 60 |
| $VO(OnC_4H_9)$ (mmole) | | 20 | 20 | 12.5 | 12.5 | 20 |
| $VOCl_3$ (mmole) | | 20 | 20 | 12.5 | 12.5 | 20 |
| Organoaluminum compound for treatment | Type | ethylaluminum sesquichloride | ethylaluminum sesquichloride | ethylaluminum sesquichloride | ethylaluminum sesquichloride | ethylaluminum dichloride |
| | (mmole) | 150 | 150 | 150 | 100 | 200 |
| Temperature for treatment (° C) | | 20 | 20 | 20 | 20 | 60 |
| Organoaluminum compound added in polymerization | Type | triethyl aluminum | triethyl aluminum | diethylaluminum monomethoxide | triethyl aluminum | triethyl aluminum |
| | (mmole) | 0.15 | 0.05 | 0.15 | 0.15 | 0.15 |
| Temperature for polymerization (° C) | | 90 | 90 | 80 | 80 | 80 |
| $PH_2$/PETY (mole %) | | 106 | 100 | 87 | 83 | 130 |
| Yield (g) | | 300 | 190 | 149 | 260 | 156 |
| MI (g/10 min.) | | 2.3 | 1.0 | 2.9 | 0.20 | 0.70 |
| FR | | 28 | 34 | 37 | 36 | 33 |

Having now fully described the invention, it will be apparent to one or ordinary skill in the art that many changes and modifications can be made thereto without departing from the spirit or scope of the invention as set forth herein.

What is claimed as new and intended to be secured by Letters Patent of the United States is:

1. A process for polymerizing an olefin which comprises effecting said polymerization in contact with a catalyst which is a combination of (1) a solid component prepared by treating a mixture of (a) a titanium tetrahalide, (b) a vanadyl alcoholate and (c) a vanadyl trihalide, with an organoaluminum compound; and (2) an organoaluminum compound.

2. The process of claim 1, wherein the molar ratio of the titanium tetrahalide to the vanadyl alcoholate and the vanadyl trihalide is in the range of 0.05 – 10.

3. The process of claim 1, wherein the molar ratio of the vanadyl trihalide to the vanadyl alcoholate is less than 5.

4. The process of claim 1, wherein the organoaluminum compound is present in said solid component (1) in an amount greater than an equimolar amount relative to the total titanium and vanadium compounds.

5. The process of claim 1, wherein the components of said catalyst are mixed under an inert gas atmosphere in an inert medium at a temperature of 0° – 150° C.

6. The process of claim 5, wherein the inert medium is an inert hydrocarbon diluent.

7. The process of claim 1, wherein the organoaluminum used for preparing the solid component (1) is selected from the group consisting of trialkylaluminum, dialkylaluminum monohalide, alkylaluminum sesquihalide and alkylaluminum dihalide.

8. The process of claim 1 wherein the amounts of the solid component (1) and the organoaluminum compound (2) are chosen so that the Al atom to total titanium and vanadium atom ratio is 0.1 to 500.

9. A catalyst for polymerizing an olefin which comprises a combination of (1) a solid component prepared by treating a mixture of (a) a titanium tetrahalide, (b) a vanadyl alcoholate and (c) a vanadyl trihalide, with an organoaluminum compound; and an organoaluminum compound.

10. The catalyst of claim 9, wherein the molar ratio of the titanium tetrahalide to the vanadyl alcoholate and the vanadyl trihalide is in the range of 0.05 – 10.

11. The catalyst of claim 9, wherein the molar ratio of the vanadyl trihalide to the vanadyl alcoholate is less than 5.

12. The catalyst of claim 9, wherein said organoaluminum compound is present in said solid component (1) in an amount greater than an equimolar amount relative to the total titanium and vanadium compounds.

13. A process for polymerizing an olefin which comprises effecting said polymerization in contact with a catalyst of a combination of (1) a solid component prepared by treating a mixture of (a) titanium tetrachloride, (b) n-butoxy vanadyl and (c) vanadyl trichloride, with ethyl-aluminum sesquichloride; and (2) triethylaluminum, wherein the molar ratio of (a) to (b) + (c) is 0.50–10 and the molar ratio of (c) to (b) is less than 5 and wherein the components (a), (b) and (c) are mixed in benzene and then the ethyl-aluminum sesquichloride component is added and the mixture stirred and the resulting solid component is recovered; wherein all mixing operations are carried out in an argon atmosphere at a temperature of 0°–150° C.

* * * * *